Nov. 28, 1961    W. MANN ET AL    3,010,541
DRUM BRAKE MOUNTING ARRANGEMENT
Filed Oct. 26, 1955    4 Sheets-Sheet 1
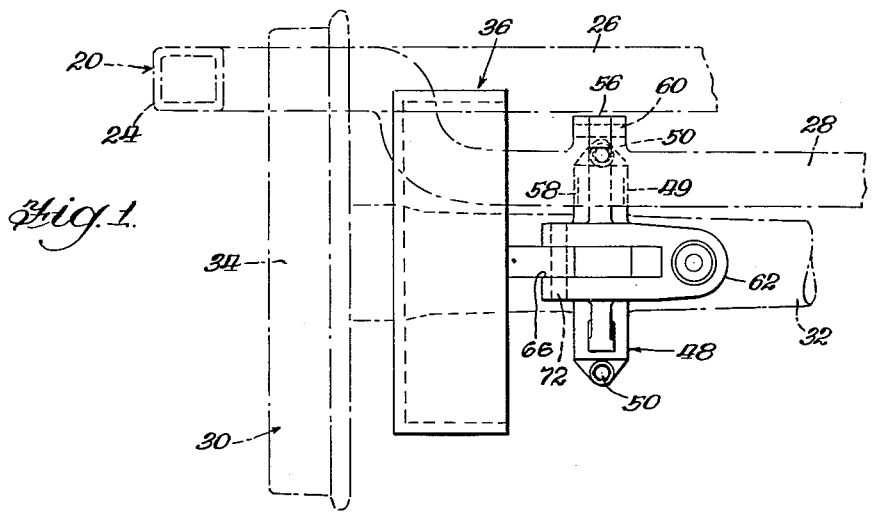
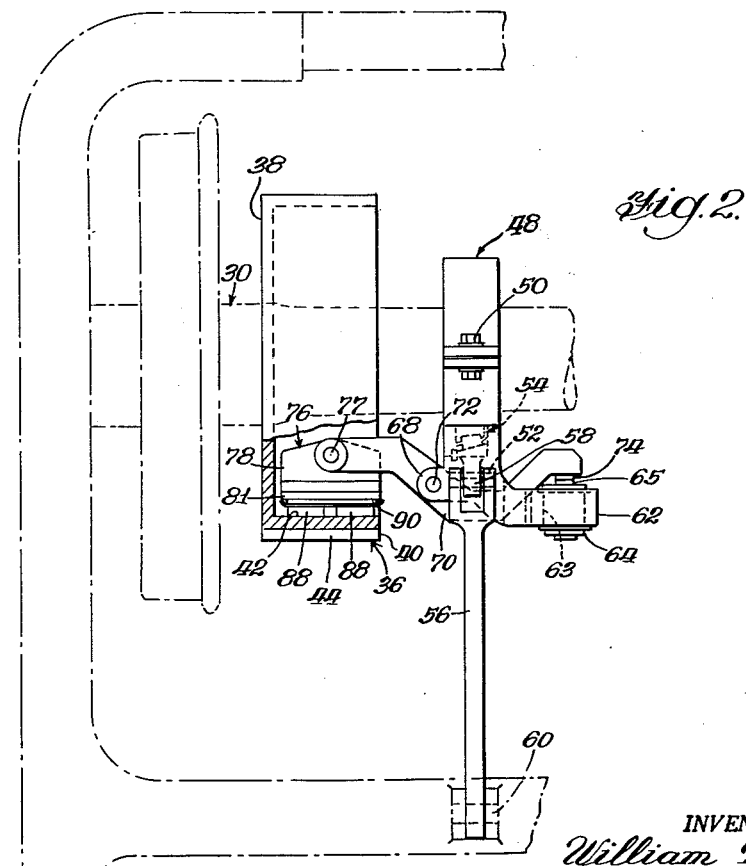
INVENTORS.
William Mann
Bernard Maloney

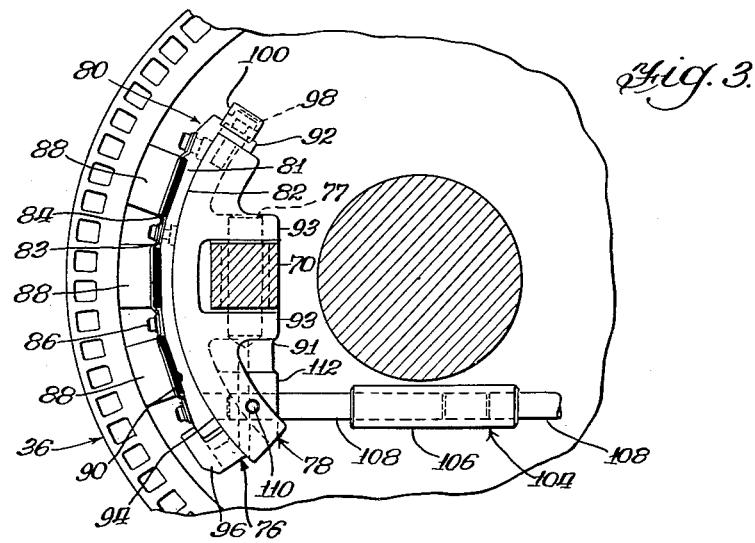
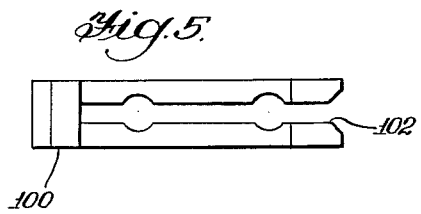
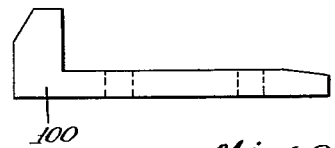
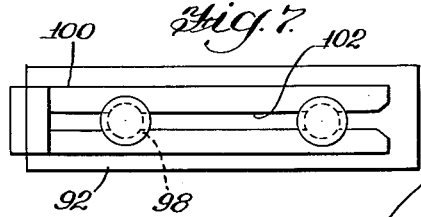
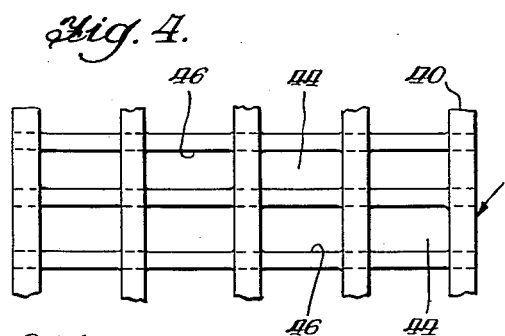
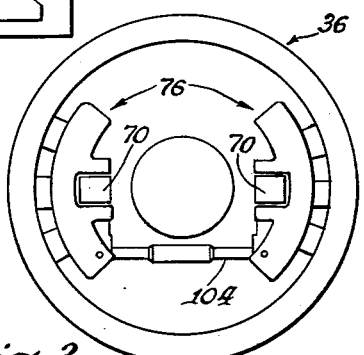

Nov. 28, 1961   W. MANN ET AL   3,010,541
DRUM BRAKE MOUNTING ARRANGEMENT
Filed Oct. 26, 1955   4 Sheets-Sheet 3

Witness:

INVENTORS
William Mann
Bernard Maloney
By Walter F. Schlegel, Jr. Atty.

Nov. 28, 1961  W. MANN ET AL  3,010,541
DRUM BRAKE MOUNTING ARRANGEMENT
Filed Oct. 26, 1955  4 Sheets-Sheet 4
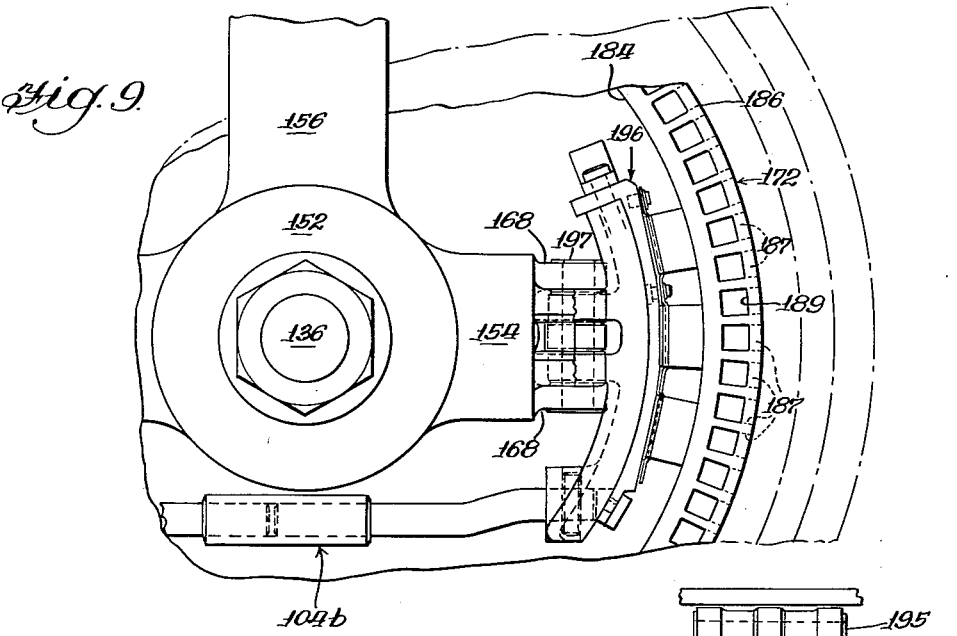
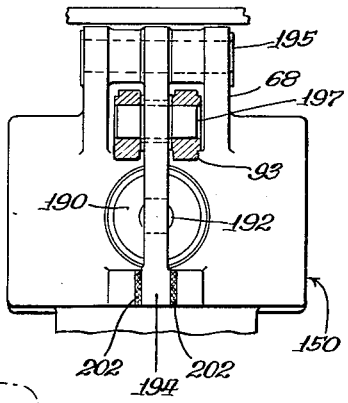
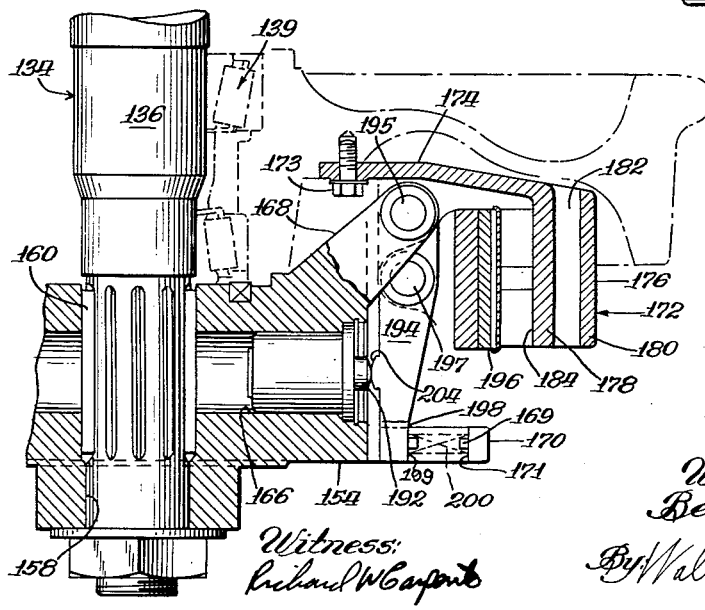
INVENTORS.
William Mann
Bernard Maloney
By Walter L. Schlegel, Jr. Atty.
Witness:
Richard W Carpenter

United States Patent Office 3,010,541
Patented Nov. 28, 1961

3,010,541
DRUM BRAKE MOUNTING ARRANGEMENT
William Mann and Bernard Maloney, Gary, Ind., assignors to American Steel Foundries, Chicago, Ill., a corporation of New Jersey
Filed Oct. 26, 1955, Ser. No. 542,911
6 Claims. (Cl. 188—58)

This invention relates to railway brakes and more particularly to that type of brake arrangement known as an off-wheel brake. The invention comprehends a brake arrangement wherein radially expanding brake means engage an internal friction surface of a rotatable drum secured to the wheel.

Although drum brakes have been used on railway cars, they have not proven satisfactory because of their characteristic self-energizing effect. Self-energization in this connection is defined as being the braking pressure applied to the shoes, in addition to that pressure produced by the actuating means, the additional pressure resulting from the frictional force along the periphery of the drum cooperating with the brake shoe mounting means to obtain a force component toward the drum which multiplies the total braking effect. When self-energization of the brakes takes place, they tend to lock. This locking effect can be prevented or restricted by the immediate release of the brakes in a vehicle such as an automobile where the operator has intimate control. However, the immediate release of brakes on railway cars is impossible because the train operator does not have the intimate control or "feel" of the vehicle as does an automobile operator.

It is, therefore, a primary object of this invention to devise an internal expanding brake means that is non-energizing.

Another object of the invention is the provision of an internal expanding drum brake arrangement wherein uniform pressure distribution between the brake means and the engaged friction surfaces is essentially attained.

Another object of the invention is to provide a means for insuring full face engagement between the braking surfaces to insure even wear of the brake shoes.

A further object of the invention is to provide an arrangement wherein the brake shoe means has a motion of translation combined with rotation about an axis perpendicular to the direction of translation.

Still another object of the invention is the provision of a brake arrangement adaptable for use in a railway car without a conventional car truck but supported directly by a wheel and axle assembly.

A more specific object is to provide an arrangement wherein the brake mechanism is directly supported by the axle.

Another object is to provide an arrangement where the brake mechanism is readily accessible without removal of the wheel.

These and other objects will become apparent from an examination of the following description and drawings, wherein:

FIGURE 1 is a fragmentary side elevational view of a portion of a railway car truck embodying one form of our invention;

FIGURE 2 is a fragmentary plan view of the structure illustrated in FIGURE 1, with certain portions being shown in horizontal section for purposes of clarity;

FIGURE 3 is a fragmentary side elevational view of the structure illustrated in FIGURE 2, as seen from the center of the assembly;

FIGURE 3a is a diagrammatic view showing a plurality of brake shoe assemblies in a braking arrangement;

FIGURE 4 is a detailed view of a portion of the outer periphery of the drum illustrated in FIGURES 1–3;

FIGURE 5 is a detailed plan view of a brake shoe assembly retaining clip;

FIGURE 6 is a side elevational view of the structure shown in FIGURE 5;

FIGURE 7 is a fragmentary plan view of a portion of the brake shoe assembly illustrated in FIGURE 3;

FIGURE 9 is a fragmentary side elevational view of the structure illustrated in FIGURE 8;

FIGURE 10 is a top plan view of the structure illustrated in FIGURE 9, a portion of which is shown in section, and FIGURE 11 is a fragmentary end elevational view of the structure illustrated in FIGURE 10, a portion of which is shown in section.

Figure 8:
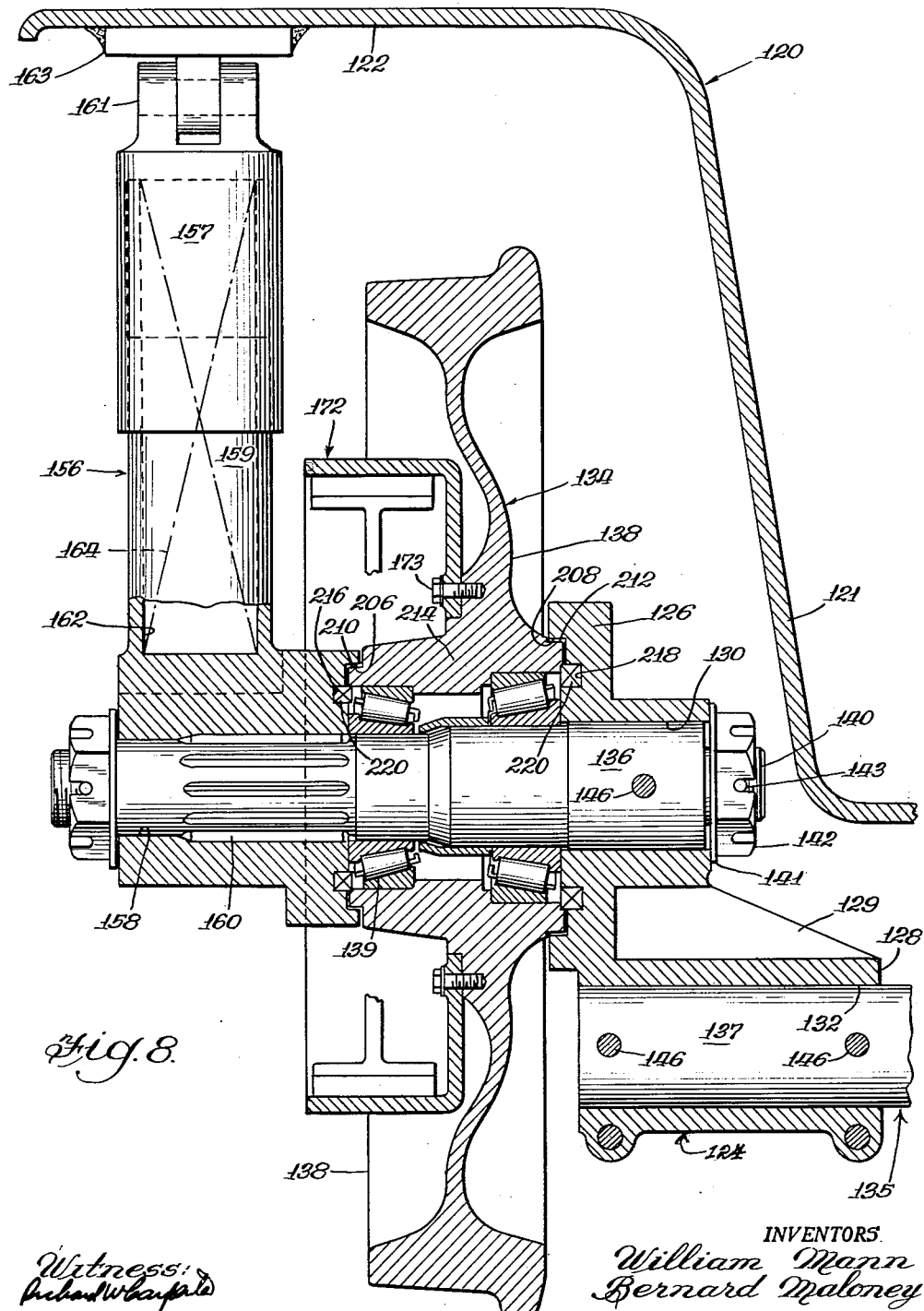
FIGURE 8 is a fragmentary transverse vertical sectional view of a modified form of the invention adapted for use with a railway car which is supported directly from a wheel and axle assembly.

It will be noted that certain elements have been intentionally omitted from certain views where it is believed that they are illustrated to better advantage in other views.

Referring now to the drawings for a better understanding of the invention, it will be seen that the embodiment of our invention which is illustrated in FIGURES 1–5 is shown as applied to a conventional railway car truck. The truck frame 20, as seen in FIGURE 1, comprises side members 24 (only one of which is shown) which are spaced from each other and interconnected by end rails 26 and transoms 28.

The frame is conventionally supported by a pair of spaced wheel and axle assemblies 30, each of which comprises a live or rotating axle 32 having wheels 34 secured thereto to rotate therewith. Each of the wheel and axle assemblies may be journaled (not shown) in the pedestal openings (not shown) of the side frame in a conventional manner. It will be noted that only a portion of one wheel and axle assembly is shown in the drawings, it being understood that the brake arrangement illustrated may be applied to either end of either wheel and axle assembly.

A drum 36 is positioned on the axle 32 and secured to the wheel 34 in any desired manner as by stud bolts (not shown) to be rotatable with the wheel. The drum preferably comprises a flat web 38 having an annular inboardly extending friction member 40 formed integrally with its outer periphery. The member 40 presents a smooth inner friction surface 42 and a preferably waffle patterned outer ventilating surface 44 comprising closely spaced apertures 46.

A brake support or housing 48 is sleeved over the axle 32 inboardly of the drum 36. The brake support preferably comprises a central cylindrical portion 49 formed in symmetrical halves which may be bolted together in the upper and lower ends by bolts 50 so as to define a substantially cylindrical cavity 52 therebetween. The axle 32 is provided with an antifriction bearing assembly 54 which is receivable in the cavity 52 of the brake housing to permit the axle to rotate freely relative thereto. A pair of torque arms 56 serve to secure the housing to the frame. Each torque arm 56 has one end connected to a lug 58 of the brake support and the other end rigidly secured to the frame as at 60.

Each half of the cylindrical center portion 49 of the brake support has a yoke or saddle bracket 62 rigidly secured thereto or integrally formed therewith. The bracket 62 is preferably U-shaped and extends in a plane generally normal to that of the cylindrical portion. The closed end of the bracket defines an eye portion 63 wherein is mounted a power cylinder 64 having a piston 65. The open end of the bracket 62 presents a substantially U-shaped slot 66 having vertically spaced ears or lugs 68 protruding therefrom in the direction of the drum.

A brake lever 70 may be fulcrumed intermediate its ends to each bracket 62 by means of pins 72 extending through the lever and the ears 68 of the bracket. The inboard end of the brake lever is operatively connected as at 74 to the power cylinder piston 65.

A brake shoe assembly 76 may be pivoted to the outboard extremity of each brake lever 70 by a pin 77 which preferably has a vertical axis of rotation. The brake shoe assembly 76, as seen in FIGURE 3, comprises a brake head 78 and a brake shoe 80. The shoe 80 is substantially arcuate in shape and includes a base plate 81 having an inner brake head engaging face 82 and an outer face 83. A relatively thin metallic strip 84 may be secured to the outer face 83 of the shoe plate by stud bolts 86, and non-metallic wear resisting pads 88 may be bonded to metallic strip 84 and spaced from each other longitudinally and transversely of the shoe. In order to afford resilient support for the pads, a cushion pad 90 may be inserted between the metal strip 84 and the shoe plate 81. The shoe plate 81 also may have a flange 92 extending inwardly from its upper edge.

The brake head 78 is also substantially arcuate in shape having an outer surface 94 and an inner side 91 presenting spaced lugs or ears 93 which pivotally receive the pin 77 to secure the head to the brake lever. The outer surface 94 of the brake head is complementary to and engageable with the inner face 82 of the shoe plate. The head is provided with a flange or lug 96 extending outwardly from the bottom of the outer face. Stud bolts 98 extend upwardly from the top of the head.

Because of the novel construction of the head and shoe, they are easily assembled in the following manner. The shoe is placed against the head with the lower portion of the shoe plate engaged by the lower lug or flange 96 of the head and the upper flange 92 of the shoe plate engaging the upper portion of the head. A substantially U-shaped clip 100 having an opening 102 is inserted over the upper flange of the shoe with the stud bolts received in the slot 102 of the clip. Thus the assembly is retained by the clip 100.

In order to maintain the faces of the respective brake head assemblies in parallel full face engagement with the friction surface of the drum to prevent tapering of the brake shoes, a readily adjustable guide bar assembly 104 has been provided. The guide bar assembly comprises a collar 106 having telescopically received therein guide bars 108 which are each secured to the respective brake head assembly as shown in FIGURE 3a in any desired manner as by a pin 110 connecting the bar to a boss 112 formed on the lower portion of the brake head.

To describe the operation of the first embodiment, it will be understood that as the piston 65 of each power cylinder 64 moves toward the wheel and axle assembly, it contacts the inboard end of the related brake lever 70 at 74 urging the brake lever to pivot counterclockwise, as seen in FIGURE 2, about pin 72. As the inboard end of brake lever 70 moves to the left, its brake shoe assembly 76 is carried into engagement with the inner friction surface 42 of the drum. The torque arms 56 transmit the braking torque to the frame. At the same time a similar brake shoe is moved into engagement on the opposite side of the axle.

It has been discovered that in a conventional internal expanding drum brake arrangement where the brake levers are pivotal about an axis parallel to the rotative axis of the drum, self-energization takes place, causing the brake shoe assemblies to lock in position when extreme pressure is applied. Self-energization has been eliminated in this invention by pivoting the brake levers and brake shoe assemblies about axes which are perpendicular to the rotative axis of the drum. Thus the brake shoes are each endowed with a movement of translation combined with a rotation about an axis perpendicular to the direction of translation.

Although in this arrangement, the brake shoe assemblies are pivotal with respect to the inboard end of the brake levers, it is necessary to have full surface engagement between the brake shoe assemblies and the surface of the drum to prevent tapering or uneven wear of the brake shoe surfaces. This is accomplished by means of the novel adjustable guide assembly 104 which interconnects the brake shoe assemblies on opposite sides of the axle to prevent their rotation with respect to the drum. Attention is again directed to FIGURE 3a.

Referring now to FIGURES 8–11, it will be seen that the basic invention, as above described, may be adapted to a special type of railway car which is supported at each end directly by a wheel and axle assembly rather than by conventional car trucks.

The body 120 of this type car, as seen in FIGURE 8, is formed with a depressed U-shaped center portion 121 and upper shelf or side portions 122 outboardly of the center portion.

The car body 120 is resiliently supported at each end by a wheel and axle assembly 134 which is housed in a frame or axle housing member 124. The frame member 124 in the illustrated embodiment is a unitary casting. However, it is understood that it may be formed in sections which are rigidly secured to each other in any desired manner, as by welding or bolting. The frame comprises upper and lower axle housing portions 126 and 128, respectively, which are preferably formed as a unit having a vertical web 129 extending therebetween to give the structure added rigidity. The upper and lower housings define generally cylindrical cavities 130 and 132, respectively, which extend transversely of the car.

The wheel and axle assembly 134, as illustrated in FIGURE 8, has an axle 135 which is formed in three sections, a pair of wheel bearing or stub axle sections 136 (only one of which is shown) and a separate center axle section 137. A wheel 138 is mounted on each stub axle section with an antifriction bearing assembly 139 interposed between the axle and the wheel to permit the rotation of the wheel with respect to the axle. Each stub axle is provided at its ends with a threaded stud portion 140 extending axially therefrom. The inboard end portion 140 of the stub axle is received within the cavity 130 of the axle housing and secured thereto by means of a washer 141 and nut 142. The nut may be retained in position by a cotter pin 143. Both the stub and center portions of the axle may be rigidly secured to the housing by pins 146 to prevent their rotation with respect to the housing.

A brake frame and car body supporting member 150 is positioned outboardly of the wheel and comprises an annular center portion 152 having cylindrical end portions 154 extending laterally therefrom on either side thereof and a vertical spring housing portion 156 extending upwardly therefrom. The annular center portion has a cylindrical cavity 158 receiving the outboard portion 140 of the axle stub which is secured in the same manner as the inboard end. A splined connection 160 may be provided between the inner surface of housing cavity 158 and the axle stub to rigidly secure brake support to the housing and transmit the braking torque.

In the preferred embodiment the vertical end lateral portions of the brake housing unit are preferably formed integrally with each other. The vertical portion presents a generally cylindrical cavity 162 housing a spring 164 which serves to resiliently support the car body, as seen in FIGURE 8.

The vertical spring housing portion may be formed of upper and lower telescoping members 157 and 159, respectively, with the upper portion 157 being secured by pin 161 to a bracket 163 depending from the shelf portion 122 of the car body.

Additional support arms (not shown) may be provided connecting the housing 156 to the car body to afford additional rigidity if desired.

The lateral end portions of the housing, only one of which is shown in FIGURE 10, each are substantially cylindrical and define a cylindrical cavity extending longitudinally of the car. Each end portion 154 is provided on its inboard side with a pair of vertically spaced lugs 168 which are preferably formed integrally therewith. The outboard side of each end portion is provided with a release spring extension bracket 170 having a cavity 171 therein.

A drum or rotor 172 may be rigidly secured to the outboard side of the wheel 138 by stud bolts 173 to be rotatable therewith. The drum preferably comprises a circular web 174 and an annular friction member 176 extending outboardly from and preferably formed integrally with the outer periphery of the web. The friction member 176 comprises inner and outer peripheral walls 178 and 180, respectively, interconnected by side walls 182. The inner wall presents a smooth friction surface 184 and the outer wall presents a ventilating surface 186 preferably of waffle design formed by spaced apertures 187. For maximum ventilation the side walls may also be provided with spaced apertures 189.

A power cylinder 190 having a piston 192 is positioned in cylindrical cavity 166 of each brake support end portion 170. A brake lever 194 disposed in a substantially horizontal plane may be fulcrumed at its outboard end to each pair of lugs 168 of the brake support by pin 195.

A brake shoe assembly 196 of the type disclosed in the first described embodiment may be pivoted to each brake lever 194 intermediate its ends of the brake lever by pin 197.

The outboard end 198 of the brake lever is positioned in cavity 171 of a spring extension bracket 170 and engaged by a release spring 200 interposed between a spring seat 199 on the end 198 of the brake lever and a spring seat 169 in the outer end of the bracket 170. If desired, a pair of wear pads 202 may be positioned in the cavity adjacent each side of the end 198 of the brake lever. A boss 204 on the brake lever between the brake shoe assembly and the outboard end of the lever is provided for operative contact with the piston 192 of the power cylinder.

A brake shoe guide assembly 104b, similar to the one described in the first mentioned embodiment, connects the brake heads disposed on opposite sides of the wheel and axle assembly. The guide assembly is the same as that of the first embodiment except that the center portion is offset or depressed slightly to accommodate the brake support housing.

Additionally, it will be noted that the brake head support 150 and the axle housing 124 may be provided with recessed shoulders 206 and 208, respectively, to engage complementally formed shoulders 210 and 212, respectively, of the hub 214 of the wheel 138. Additionally, both the brake support and the axle housing may be provided with recesses 216 and 218 for bearing seals 220.

The principle involved in the operation of this embodiment is the same as that for the first described embodiment. Here, as the power cylinder piston engages the boss 204 of the brake lever, the brake lever is pivoted counterclockwise about pin 195 and the brake shoe is carried into engagement with the inner surface of the drum. The release spring 200 is operative to return the brake lever to the original position when pressure from the power cylinder is released.

The spline connection 160 between the brake support and axle affords a rigid connection therebetween and permits the braking torque to be transmitted from the support through the axle to the car frame.

We claim:

1. In an internal drum brake arrangement for a railway car having a body member supported by a wheel and axle assembly, the combination of: a rotatable drum secured to said assembly and presenting a rotatable cylindrical friction surface, a brake support directly supported by and sleeved on the axle and having an operative connection to the body member, power means on the brake support, brake lever means pivoted to the support and operatively connected to the power means, and friction means connected to the brake lever means and engageable with said drum surface, said friction means being arranged and disposed for movement toward and away from said surface in a plane extending in a radial direction and being rotatable about an axis substantially normal to said direction to prevent self-energizing effects of the friction means and to insure uniform pressure distribution between the friction means and the surface.

2. In a drum brake arrangement for a vehicle having a frame and a supporting wheel and axle assembly including a rotatable drum with a cylindrical internal friction surface, the combination of: a brake support directly supported by and sleeved on said axle, power means carried by the brake support, a brake lever pivoted intermediate its ends on said brake support on an axis normal to the rotational axis of the drum, said brake lever having one end operatively engaged by the power means, a brake shoe assembly mounted on the opposite end of the brake lever and positioned for movement into and out of braking engagement with said friction surfaces in response to swinging movement of the brake lever about its axis, said brake shoe assembly being so mounted on said brake lever for limited movement about an axis parallel with the brake lever axis and thus normal to the rotational axis of the drum for enabling accurate positioning of the brake shoe relative to said friction surface, adjustable means connected with the brake shoe assembly for producing the stated accurate positioning of the brake shoe assembly, and means connecting the brake support and the vehicle frame for transmitting braking torque from the brake support to the vehicle frame.

3. The invention set out in claim 2 in which the torque transmitting means comprises a torque arm connecting the brake support with the vehicle frame.

4. The invention set out in claim 2 in which the brake shoe assembly, in its movements into and out of said braking engagement, moves radially of the drum and substantially in a radial plane relative thereto.

5. The invention set out in claim 2 in which the axle of the wheel and axle assembly is rotatable and journalled in the brake support.

6. The invention set out in claim 2 in which a plurality of shoe assemblies are arranged on opposed portions of the drum, and mounting means is provided for each brake shoe assembly, and the adjusting means interconnects opposed brake shoe assembly.

References Cited in the file of this patent

UNITED STATES PATENTS

| | | |
|---|---|---|
| 1,480,822 | Hubalek | Jan. 15, 1924 |
| 1,597,831 | Saives | Aug. 31, 1926 |
| 1,956,315 | Collins | Apr. 24, 1934 |
| 2,095,039 | Schmidt | Oct. 5, 1937 |
| 2,196,242 | Anderson | Apr. 9, 1940 |
| 2,374,738 | Frede | May 1, 1945 |
| 2,415,345 | Eksergian | Feb. 4, 1947 |
| 2,435,977 | Morgan | Feb. 17, 1948 |
| 2,440,020 | Pratt | Apr. 20, 1948 |
| 2,451,326 | Eksergian et al. | Oct. 12, 1948 |
| 2,630,889 | Lewis | Mar. 10, 1953 |
| 2,631,697 | Bondkowski | Mar. 17, 1953 |

FOREIGN PATENTS

| | | |
|---|---|---|
| 5,757 | Great Britain | of 1902 |
| 119,108 | Switzerland | July 1, 1926 |